(12) United States Patent
Dumoulin et al.

(10) Patent No.: US 12,404,591 B2
(45) Date of Patent: Sep. 2, 2025

(54) HIGH TEMPERATURE ELECTROLYSER SYSTEM OPTIMISED BY DEPRESSION OF THE STEAM SUPPLY

(71) Applicant: COMMISSARIAT A L'ENERGIE ATOMIQUE ET AUX ENERGIES ALTERNATIVES, Paris (FR)

(72) Inventors: Pierre Dumoulin, Grenoble (FR); Philippe Bandelier, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 28 days.

(21) Appl. No.: 18/250,775

(22) PCT Filed: Oct. 25, 2021

(86) PCT No.: PCT/EP2021/079531
§ 371 (c)(1),
(2) Date: Apr. 27, 2023

(87) PCT Pub. No.: WO2022/090151
PCT Pub. Date: May 5, 2022

(65) Prior Publication Data
US 2023/0399764 A1    Dec. 14, 2023

(30) Foreign Application Priority Data
Oct. 30, 2020    (FR) ........................................ 2011129

(51) Int. Cl.
*C25B 1/042*    (2021.01)
*C25B 9/67*    (2021.01)
*C25B 15/021*    (2021.01)

(52) U.S. Cl.
CPC ................ *C25B 1/042* (2021.01); *C25B 9/67* (2021.01); *C25B 15/021* (2021.01); *Y02E 60/36* (2013.01)

(58) Field of Classification Search
CPC ........... C25B 1/04; C25B 1/042; C25B 15/08; C25B 15/021; Y02E 20/34
(Continued)

(56) References Cited

U.S. PATENT DOCUMENTS

| 7,863,340 B2 * | 1/2011 | Severinsky ............... C25B 1/04 |
| | | 518/700 |
| 11,060,196 B2 * | 7/2021 | Colomar .................... C25B 1/04 |

(Continued)

FOREIGN PATENT DOCUMENTS

| CN | 110904464 A | 3/2020 |
| WO | WO 2020/107047 A1 | 6/2020 |

OTHER PUBLICATIONS

Sinnott et al. (Chemical Engineering Design (6th Edition)—3.17 Heat Exchanger Networks (pp. 114-134) 2020 Elsevier (Year: 2019).*

(Continued)

*Primary Examiner* — Luan V Van
*Assistant Examiner* — Alexander R. Parent
(74) *Attorney, Agent, or Firm* — Oblon, McClelland, Maier &Neustadt, L.L.P.

(57) ABSTRACT

A system includes a high temperature electrolyser, a first supply line of the electrolyser configured to supply the electrolyser with steam, a first discharge line of the electrolyser configured to discharge dihydrogen from the electrolyser, a second discharge line of the electrolyser configured to discharge dioxygen from the electrolyser, a first heat exchange module configured to ensure a heat exchange between the first supply line and the first dihydrogen dis- (Continued)

charge line, and a steam generator arranged on the first supply line, upstream from the first heat exchange module, and configured to produce steam from liquid water. The system also includes a module for depressing a section of the first supply line and having an expansion device and a compressor. The expansion device is arranged on the first supply line upstream from the steam generator, and the compressor is arranged on the first supply line downstream from the steam generator.

15 Claims, 3 Drawing Sheets

(58) Field of Classification Search
USPC .......................................... 205/628
See application file for complete search history.

(56) References Cited

U.S. PATENT DOCUMENTS

| | | | |
|---|---|---|---|
| 12,221,709 B2* | 2/2025 | Dumoulin | C25B 1/042 |
| 2013/0126360 A1 | 5/2013 | Ise et al. | |
| 2018/0287179 A1* | 10/2018 | Rueger | C25B 1/042 |
| 2022/0052360 A1 | 2/2022 | Reichholf et al. | |

OTHER PUBLICATIONS

International Search Report & Written Opinion issued Feb. 9, 2022 in PCT/EP2021/079531 filed on Oct. 25, 2021 7 pages.

* cited by examiner

HIGH TEMPERATURE ELECTROLYSER SYSTEM OPTIMISED BY DEPRESSION OF THE STEAM SUPPLY

TECHNICAL FIELD OF THE INVENTION

The present invention relates to the field of high temperature water electrolysis (HTE, or HTSE for high temperature steam electrolysis), also with solid oxide (SOEC, solid oxide electrolyte cell), and that of solid oxide fuel cells (SOFC). It applies particularly to optimise the energy consumption of an SOEC electrolyser system.

STATE OF THE ART

Water electrolysis is an electrolytic reaction which decomposes water into gaseous dioxygen and dihydrogen using an electric current according to the reaction: $H_2O \rightarrow H_2 + \frac{1}{2} O_2$.

To perform water electrolysis, it is advantageous to perform it at high temperature typically between 600 and 950° C., as some of the energy necessary for the reaction can be provided by heat which is less expensive than electricity and the activation of the reaction is more effective at a high temperature and does not require any catalyst. A solid oxide electrolyte cell (SOEC) comprises, in particular: —a first porous conductive electrode, or "cathode", intended to be supplied with steam to produce dihydrogen, —a second porous conductive electrode, or "anode", through which the dioxygen produced by the electrolysis of water injected on the cathode escapes, and—a solid oxide membrane (dense electrolyte) sandwiched between the cathode and the anode, the membrane being anionically conductive for high temperatures, usually temperatures greater than 600° C. By heating the cell at least to this temperature and by injecting an electric current I between the cathode and the anode, a reduction of water on the cathode thus occurs, which generates dihydrogen ($H_2$) at the cathode and dioxygen at the anode. To implement high temperature electrolysis, it is known to use an SOEC-type electrolyser constituted of a stack of elementary patterns each comprising a solid oxide electrolysis cell, constituted of three anode/electrolyte/cathode layers superposed on one another, and interconnecting plates made of metal alloys, also called bipolar plates, or interconnectors. The interconnectors have the function of ensuring both the passage of the electric current and the circulation of gases in the vicinity of each cell (injected steam, hydrogen and oxygen extracted in an HTE electrolyser; air and hydrogen injected and water extracted in an SOFC cell) and to separate the anodic and cathodic compartments which are the gas circulation compartments on the side respectively of the anodes and of the cathodes of the cells.

To perform high temperature steam electrolysis HTE, steam $H_2O$ is injected into the cathodic compartment.

Under the effect of the current applied to the cell, the separation of the water molecules in steam form is performed at the interface between the hydrogen electrode (cathode) and the electrolyte: this separation produces dihydrogen gas $H_2$ and oxygen ions. Dihydrogen is collected is discharged at the hydrogen compartment outlet. The oxygen ions migrate through the electrolyte and recombine in dioxygen $O_2$ at the interface between the electrolyte and the oxygen electrode (anode).

For the effective implementation of electrolysis through the stack, the stack is brought to a temperature greater than 600° C., usually a temperature of between 600° C. and 950° C., the gas supply is started at a constant flow rate and an electric supply source is connected between two terminals of the stack in order to make the current I circulate there.

The yield of the transformation of electricity into hydrogen is a key point in order to ensure the competitivity of the technology. The electric consumption mainly occurs during the electrolysis reaction strictly speaking, but almost 30% of the consumption of the electrolyser comes from the fluid thermal/hydraulic management system, i.e. the architecture external to the electrolyser and the management of fluids and thermal energy in this architecture.

The evaporation of the water used in the electrolyser is the greatest energy consumption of this thermal/hydraulic management system. Conventionally, this function is ensured by an electric steam generator which consumes 20% of the overall consumption of the electrolyser.

Moreover, generally a significant portion of energy is discharged into the ambient environment. For example, during the hydrogen drying phase and its compression, it is necessary to highly cool this mixture in order to enable the condensation of water has in the water/hydrogen mixture. This condensation is performed by and large at a temperature less than the evaporation temperature of water at the inlet of the electrolyser, which means that a very low portion of this condensation energy is usable.

Document CN110904464 A1 is known, which describes a system for producing hydrogen by offshore wind power energy-based seawater electrolysis. The system comprises an evaporator ensuring the production of steam by heat exchange with the dihydrogen produced. The evaporator is a heat exchanger which is depressed by a vacuum pump. This system does not appear to resolve the disadvantages cited above. The system is itself complex and not very suitable.

There is therefore a need to minimise this consumption by optimising the architecture and the management of fluids of the electrolyser system.

An aim of the present invention is therefore to propose an optimised high temperature electrolyser system.

The other aims, features and advantages of the present invention will appear upon examining the following description and the accompanying drawings. It is understood that other advantages can be incorporated.

SUMMARY OF THE INVENTION

To achieve this aim, according to an embodiment, the invention provides a system comprising a high temperature electrolyser (HTE), a first supply line of the electrolyser configured to supply the electrolyser with steam, a first discharge line of the electrolyser configured to discharge dihydrogen from the electrolyser, a second discharge line of the electrolyser configured to discharge dioxygen from the electrolyser, a first heat exchange module configured to ensure a heat exchange between the first steam supply line and the first dihydrogen discharge line, a steam generator arranged on the first steam supply line, upstream from the first heat exchange module, and configured to produce steam from liquid water, characterised in that the system comprises a module for depressing a section of the first supply line, the module comprising an expansion device and a compressor, the expansion device being arranged, on the first steam supply line, upstream from the steam generator and the compressor being arranged on the first steam supply line, downstream from the steam generator.

Thus, the system proposes to reduce the pressure in the section of the first supply line in order to decrease the boiling point of water circulating in the first supply line. The depression is then preferably compensated for by a recompression to atmospheric pressure, once the evaporation of steam performed in the steam generator. The section which is depressurised surrounds the steam generator.

Preferably, the boiling of the water is performed at a temperature less than the temperature of the thermal discharge of the electrolyser and, in particular, the temperature of dioxygen and dihydrogen, which favours the exchange and therefore the utilisation of thermal discharges.

Another aspect relates to a system such as described above comprising a module for recovering thermal energy from dihydrogen at the outlet of the first heat exchange module to the benefit of the first steam supply line, the recovery module comprising a heat pump comprising a fluid circuit configured to receive a heat-transfer fluid, a first evaporator arranged on the first discharge line downstream from the first heat exchange module configured to transfer the thermal energy of the dihydrogen to the heat-transfer fluid, a compressor configured to compress the heat-transfer fluid, a condenser arranged on the first steam supply line upstream from the steam generator and configured to transfer the thermal energy from the heat-transfer fluid to the liquid water, an expansion device configured to expand the heat-transfer fluid, the fluid circuit being configured to fluidically connect the first evaporator to the compressor, the compressor to the condenser, the condenser to the expansion device and the expansion device to the first evaporator.

This arrangement makes it possible to recover the thermal energy of the dihydrogen produced by the electrolyser to contribute to the evaporation of the liquid water and therefore to reduce the energy consumption of the system.

This makes it possible to utilise calories more by advantageously coupling the system depressed with a heat pump. The depletion of the cold source, i.e. of the dihydrogen produced by the electrolyser, can make it possible to reach a temperature less than the ambient temperature which is very favourable to the energy balance and to the draining of hydrogen (and therefore its quality).

Thus, the system uses the heat from the dihydrogen at the outlet of the electrolyser, but after the first heat exchange module such that the thermal discharge of the dihydrogen in the evaporator is utilised at a lower temperature via an active system of a heat pump. The calories recovered from the dihydrogen are reinjected at a temperature greater than the evaporation temperature of the water upstream from the steam generator.

BRIEF DESCRIPTION OF THE FIGURES

The aims, objectives, as well as the features and advantages of the invention will emerge best from the detailed description of an embodiment of the latter, which is illustrated by the following accompanying drawings, wherein.

Figure 1:
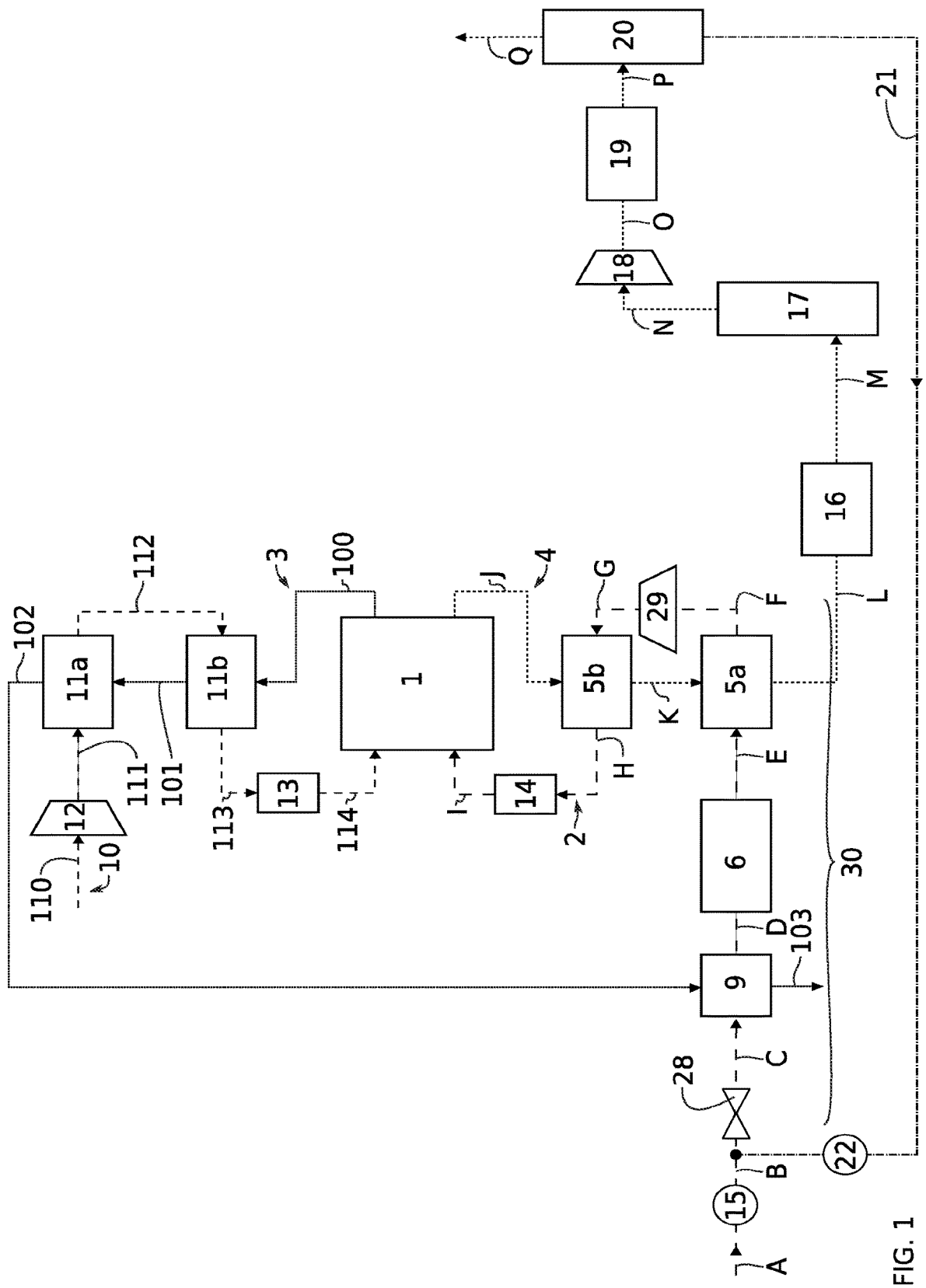
FIG. 1 is a functional diagram representing the system according to the invention.

The drawings are given as examples and are not limiting of the invention. They constitute principle schematic representations intended to facilitate the understanding of the invention and are not necessarily to the scale of practical applications.

DETAILED DESCRIPTION OF THE INVENTION

Before starting a detailed review of embodiments of the invention, optional features are stated below, which can optionally be used in association or alternatively:

According to an example, the compressor 29 is arranged downstream from the first heat exchange module 5.

It is advantageous that the compression by the compressor 29 is performed on a gas flow only and not a gas/liquid mixture. By performing the compression downstream from the first heat exchange module, this ensures that almost all of the liquid water has been transformed into steam.

According to an example, the first heat exchange module 5 comprises a first heat exchanger 5a and a second heat exchanger 5b arranged in series on the first supply line 2, the compressor 29 is arranged downstream from the first heat exchanger 5a and upstream from the second heat exchanger 5b.

According to an example, the system comprises a first heat exchanger 9 arranged between the second dioxygen discharge line 3 and the first steam supply line 2, upstream from the steam generator 6.

Thus, this first heat exchanger 9 contributes to raising the temperature of the liquid water before the steam generator 6, so as to limit its energy consumption, thanks to the recovery of heat from the dioxygen produced by the electrolyser.

According to an example, the expansion device 28 is arranged on the first supply line 2 upstream from the first heat exchanger 9.

According to an example, the system comprises a second supply line 10 of the electrolyser configured to supply the electrolyser with air or a gas containing oxygen.

According to an example, the system comprises a second heat exchange module 11 configured to ensure a heat exchange between the second air supply line 10 and the second dioxygen discharge line 3.

Thus, the second heat exchange module 11 makes it possible to heat the incoming air flow by the heat from the outgoing dioxygen flow.

According to an example, the system comprises at least one second heat exchanger 16 arranged on the first dihydrogen discharge line 4, downstream from the first evaporator 25a.

According to an example, the heat pump comprises a second evaporator 25b.

According to an example, the second evaporator 25b is arranged in series on the fluid circuit 27 of the heat pump downstream from the first heat exchanger 9.

According to an example, the system comprises at least one third heat exchanger 19 arranged on the first dihydrogen discharge line 4, downstream from the second evaporator 25b.

According to an example, the system comprises, downstream from the second heat exchanger 16, and upstream from the second evaporator 25a, a liquid/gas separator 17.

According to an example, the second heat exchanger 16 is arranged between the first dihydrogen discharge line 4, downstream from the first evaporator 25a, and the second air supply line 10.

Thus, the second heat exchanger 16 arranged between the second air supply line 10 and the first dihydrogen discharge line 4 makes it possible to use the residual heat from the dihydrogen to heat the incoming air going to the electrolyser 1. The exchanger advantageously replaces an air cooler which makes it possible to avoid the consumption of the ventilator of the air cooler, which uses a lot of energy.

According to an example, the system comprises a compressor 12 arranged on the second air supply line 10 and intended to compress air, preferably arranged upstream from the second heat exchange module 11 and preferably downstream from the second heat exchanger 16.

Upstream and downstream, the inlet, the outlet, in a given point are taken as reference in the circulation direction of the fluid.

By a parameter "substantially equal to/greater than/less than" a given value, this means that this parameter is equal to/greater than/less than the given value, more or less 10%, even more or less 5%, of this value.

The system according to the invention comprises a high temperature electrolyser (HTE) 1. Preferably, the electrolyser 1 is of the SOEC type (solid oxide electrolyte cell).

The system comprises several supply and discharge lines connected to the electrolyser 1. Thus, by a line, this means a pipe, a tube or a set of pipes or tubes which enable the transport of fluid to and from the electrolyser 1.

The system according to the invention comprises a first supply line 2 of the electrolyser 1 capable of supplying the electrolyser 1 with steam. According to an option, the first supply line 2 is configured to provide the electrolyser 1 with steam, this means that the first supply line 2 can provide a mixture of steam and other gas(es), for example air or dihydrogen or carbon dioxide. Upstream in this first supply line 2, the steam is not yet formed and the first supply line 2 is configured to receive liquid water. According to a preferred option, the first supply line 2 comprises a first portion receiving liquid water and a second portion receiving steam. Preferably, the first portion is located upstream from a steam generator 6 and the second portion is located downstream from said steam generator 6.

The system according to the invention comprises a first discharge line 4 capable of discharging dihydrogen ($H_2$) from the electrolyser 1. Preferably, the first discharge line 4 receives dihydrogen. Dihydrogen is advantageously produced by the electrolyser 1. The dihydrogen is in gaseous form. The first discharge line 4 can discharge a mixture of dihydrogen and steam, called residual, not having been decomposed by the electrolyser 1.

The system according to the invention comprises a second discharge line 3 capable of discharging dioxygen ($O_2$) from the electrolyser 1. Preferably, the second discharge line 3 receives dioxygen. The dioxygen is advantageously produced by the electrolyser 1. The dioxygen is in gaseous form. The second discharge line 3 discharges a dioxygen-enriched gas according to an option, for example, dioxygen-enriched air.

Below in the description, the first supply line 2 is called first steam supply line 2, the first discharge line 4 is called first dihydrogen discharge line 4 and the second discharge line 3 is called second dioxygen discharge line 3 without being limiting gas, fluid or the mixture being able to be transported in these lines.

According to an option, the system comprises a first heat exchange module 5 configured to ensure a heat exchange between the first steam supply line 2 and the first dihydrogen discharge line 4. This heat exchange module is configured to transfer the calories of the dihydrogen coming from the electrolyser 1 to the water intended to supply the electrolyser 1. A dihydrogen gas flow ensures the increase in temperature of the water flow while also making it possible to cool the discharged dihydrogen flow and which is advantageously drained and/or compressed in view of its use.

The first heat exchange module 5 comprises, according to an embodiment, at least one heat exchanger 5a configured to ensure the heat transfer from the dihydrogen to the steam. According to a preferred embodiment, the first heat exchange module 5 comprises two heat exchangers 5a, 5b arranged in series between the first supply line 2 and the first discharge line 4. This arrangement makes it possible to provide a second heat exchanger 5b adapted to the temperature of the dihydrogen at the outlet of the electrolyser 1, conventionally around 700° C., and a first more usual heat exchanger 5a adapted to the temperature of the dihydrogen after the passage into a heat exchanger, that is conventionally around 330° C. In this way, the components are optimised for the temperatures and heat transfers to be achieved.

The system according to the invention comprises a steam generator 6. The steam generator 6 is intended to produce steam from liquid water. The steam generator 6 is supplied with energy to ensure the increase in temperature of the liquid water above its evaporation temperature. The steam generator 6 is a component constituting the main energy consumption of an electrolyser system according to the state of the art. The steam generator 6 is arranged on the first steam supply line 2.

According to a first aspect of the invention illustrated in FIG. 1, the system comprises a module for depressing a section 30 of the first supply line 2. The depression module is arranged on the first steam supply line 2. The depression module is arranged on the first steam supply line 2. The depression module comprises an expansion device 28 and a compressor 29. Advantageously, the expansion device 28 is arranged upstream from the steam generator 6 so as to lower the pressure in the first supply line 2 upstream from the steam generator 6 and preferably in the steam generator 6. This pressure drop makes it possible to lower the evaporation temperature of liquid water in steam in the steam generator 6. Advantageously, the depression module comprises a compressor 29 arranged downstream from the steam generator 6. The compressor 29 is preferably arranged on the first supply line 2 with a place where the water circulating in the first supply line is by and large in the vapour phase. According to an option, the compressor 29 is arranged downstream from the first heat exchange module 5. Indeed, the compression is more effective when the fluid flow is only composed of gas, in this case, steam. Thus, it is preferable to have overheated the steam in the first heat exchange module 5 to ensure that there is no liquid water in the flow. Preferably, the compressor 29 is arranged downstream from the first heat exchanger 5a and upstream from the second heat exchanger 5b of the first heat exchange module 5. Indeed, this positioning, before the second heat exchanger 5b, limits the thermal stresses on this component and therefore its cost. In addition, the compression after the second heat exchanger 5b would make the temperature exceed 700° C. specified at the inlet of the electrolyser 1.

As an example, the module for depressing a section 30 of the first supply line 2 ensures a 200 mbars depression. The evaporation temperature of liquid water is thus lowered to 60° C. Such a depressurisation is also compensated for by the compressor 29 without requiring a very high energy consumption. The energy efficiency is thus favourable.

The section 30 of the first supply line 2 which is depressed by the depression module extends between the expansion device 28 and the compressor 29 and advantageously comprises the steam generator 6.

According to an embodiment, the system comprises a first heat exchanger 9 arranged on the first steam supply line 2 and on the second dioxygen discharge line 3. The first heat exchanger 9 is preferably arranged on the first supply line 2 upstream from the generator 6. The first heat exchanger 9 is arranged on the first portion of the first supply line 2. Preferably, the first heat exchanger 9 is arranged on the first section 30, i.e. between the expansion device 28 and the compressor 29. This first heat exchanger 9 is configured to ensure the heat transfer of calories removed on the dioxygen flow discharged from the electrolyser 1 and circulating in the second discharge line 3 to the benefit of the steam supply line 2. The first heat exchanger 9 is configured to transmit the thermal energy of the dioxygen at the outlet of the electrolyser 1 to the liquid water, upstream from the steam generator 6.

According to an embodiment, the system comprises a second supply line 10 capable of supplying the electrolyser 1 with air. Preferably, the second supply line 10 receives air. According to an option, the second supply line 10 is configured to provide air to the electrolyser 1, by that this means that the second supply line 10 can provide air, the air being, for example, a gaseous mixture, which makes it possible to sweep the cell of the electrolyser 1 and to remove the dioxygen produced by the electrolyser 1.

According to this embodiment, it is advantageous that the system according to the invention comprises a second heat exchange module 11 configured to ensure a heat exchange between the second air supply line 10 and the second dioxygen discharge line 3. This heat exchange module 11 is configured to transfer the calories of the dioxygen coming from the electrolyser 1 to the air intended to supply the electrolyser 1. A dioxygen gas flow ensures the increase in temperature of the air flow which also makes it possible to cool the discharged dioxygen flow.

The second heat exchange module 11 comprises, according to an embodiment, at least one heat exchanger 11a configured to ensure the heat transfer of dioxygen to air. According to a preferred embodiment, the second heat exchange module 11 comprises two heat exchangers 11a, 11b arranged in series between the second supply line 10 and the second discharge line 3. This arrangement makes it possible to provide a second heat exchanger 11b adapted to the temperature of the dioxygen at the outlet of the electrolyser 1, conventionally around 700° C., and a first more usual heat exchanger 11a adapted to the temperature of the dioxygen after the passage into a heat exchanger, that is conventionally around 330° C. In this way, the components are optimised for the temperatures and heat transfers to be achieved.

The system preferably comprises a compressor 12 arranged on the second supply line 10 intended to supply air. The compressor 12 is preferably arranged upstream from the second heat exchange module 11, if it is present. The compressor 12 is intended to ensure the compression of air intended to be supplied to the electrolyser 1. The compression of the air advantageously contributes to increasing the temperature of the air before it enters into the electrolyser 1.

According to an embodiment, the system comprises means for treating the dihydrogen flow produced. The dihydrogen produced by the electrolyser 1 and which emerges from it through the first discharge line 4 first has a very high temperature corresponding to the reaction temperature of the electrolyser 1. Yet, in view of its use, the dihydrogen must preferably be brought to a temperature close to the ambient temperature. Moreover, the dihydrogen discharged from the electrolyser 1 through the first discharge line 4 can comprise the steam removed with the dihydrogen flow. It is therefore also preferred to separate the dihydrogen from the possible steam removed with it, by draining it.

The system according to the invention advantageously comprises, to this end, at least one first treatment stage intended for the draining and/or compression of the dihydrogen produced.

According to an option, the first treatment stage comprises a second heat exchanger 16. The second heat exchanger 16 is arranged on the first discharge line 4, preferably downstream from the first heat exchange module 5. This second heat exchanger 16 is, according to a first option, an air cooler 16, i.e. a heat exchanger between a fluid and a gas, the gas being moved by a ventilator. According to another option, the heat exchanger is a standard cooler, i.e. without ventilator, this solution however being less effective. According to an option not represented in FIG. 1, the second heat exchanger 16 ensures the heat exchange between the fluid and a gas and, in particular, the air intended to supply the electrolyser 1. This arrangement makes it possible to both avoid the air cooler and its energy consuming ventilator and to enhance the waste heat from the dihydrogen circulating in the first discharge line 4 to the benefit of the air supplying the electrolyser 1.

The system thus comprises the second exchanger 16 arranged on the first dihydrogen discharge line 4 and on the second air supply line 10. The fluidic connection 110 is therefore connected between the outlet of the second heat exchanger and the inlet of the compressor 12. In this way, the air intended to enter into the electrolyser 1 is preheated by the transfer of calories from the dihydrogen. Preferably, the arrangement of the second heat exchanger corresponds to that of the air cooler 16 described above.

The first treatment stage advantageously comprises a liquid/gas separator 17 arranged downstream from the second heat exchanger 16. The separator 17 makes it possible to separate the liquid water from the gaseous dihydrogen, the liquid water resulting from the cooling of the steam in the second heat exchanger 16 below its condensation point.

According to a preferred option, the system comprises a second treatment stage arranged downstream from the first treatment stage on the first discharge line 4. The second treatment stage makes it possible to complete the draining of the dihydrogen. The second treatment stage advantageously comprises a third heat exchanger 19 which, like for the first stage, can be a standard cooler, an air cooler or heat exchanger 19 between a fluid (dihydrogen) and the air intended to supply the electrolyser 1. The third exchanger 19 is arranged on the first dihydrogen discharge line 4, preferably downstream from the second heat exchanger 16, and on the second air supply line 10 preferably upstream from the second heat exchanger 16. The second stage preferably comprises a liquid/gas separator 20. Preferably, the system comprises, between the first treatment stage and the second treatment stage, a compressor 18 configured to enable the second treatment by the third heat exchanger 19 by increasing the temperature of the mixture beforehand, so as to be able to cool it again.

From the first treatment stage and/or the second treatment stage, if present, the liquid water is preferably recycled by being returned to the first steam supply line 2 through a water recycling line 21. The water recycling line is fluidically connected to the first supply line 2, preferably upstream from the steam generator 6, preferably upstream from the first heat exchanger 9, i.e. preferably on the first portion of the first supply line 2. The dihydrogen is itself used and in particular stored after conventional treatments.

According to an option, the system comprises at least one complementary heat source configured to heat the steam entering into the electrolyser 1 to a predefined target temperature. The complementary heat source is advantageously arranged on the first steam supply line 2, preferably downstream from the first heat exchange module 5. The complementary heat source is, for example, an electric heater 14.

According to an option, the system comprises at least one complementary heat source configured to heat the air entering into the electrolyser 1 to a predefined target temperature. The complementary heat source is advantageously arranged on the second air supply line 10, preferably downstream from the second heat exchange module 11. The complementary heat source is, for example, an electric heater 13.

According to an embodiment, the system comprises at least one pump 15 arranged on the first steam supply line 2 configured to move the liquid water in the first portion of the first supply line 2 upstream from the steam generator 6.

The system preferably comprises a pump 22 on the water recycling line 21. The pump 22 is configured to move the liquid water circulating in the water recycling line 21 and coming from the gas/liquid separator 20.

Preferably, the electrolyser 1 is fluidically connected to the first steam supply line 2. The first steam supply line 2 ensures the fluidic connection of components arranged upstream from the electrolyser 1 on said first supply line 2. The description below is made by starting upstream from the electrolyser 1 and by following the circulation direction in the first supply line. The first supply line 2 ensures the fluidic connection of the expansion device 28 to the first heat exchanger 9, then the fluidic connection of the first heat exchanger 9 to the steam generator 6, then the fluidic connection of the steam generator 6 to the first heat exchange module 5, preferably to the first heat exchanger 5a, then the fluidic connection of the first heat exchanger 5a to the compressor 29, then the fluidic connection of the compressor 29 to the second heat exchanger 5b, then the fluidic connection of the second heat exchanger 5b to the electric heater 14, then the fluidic connection of the electric heater 14 to the electrolyser 1.

Preferably, the electrolyser 1 is fluidically connected to a first dihydrogen discharge line 4. The first discharge line 4 ensures the fluidic connection of components arranged downstream from the electrolyser 1 on said first discharge line. The description below is made by starting from the electrolyser 1 and by following the circulation direction in the first discharge line 4 from the electrolyser 1. The first discharge line 4 ensures the fluidic connection of the electrolyser 1 with the first heat exchange module 5, more preferably with the second heat exchanger 5b to the first heat exchanger 5a, then the fluidic connection of the first heat exchanger 5 to the second heat exchanger 16, then the fluidic connection of the second heat exchanger 16 to the liquid/gas separator 17, then the fluidic connection of the liquid/gas separator 17 to the compressor 18, then advantageously the fluidic connection of the compressor 18 to the third heat exchanger 19, then the fluidic connection of the second heat exchanger 19 to the liquid/gas separator 20.

Preferably, the electrolyser 1 is fluidically connected to one of second dioxygen discharge line 3. The second discharge line 3 ensures the fluidic connection of components arranged downstream from the electrolyser 1 on said second discharge line 3. The description below is made by starting from the electrolyser 1 and by following the circulation direction in the second discharge line 3 from the electrolyser 1. The second discharge line 3 ensures the fluidic connection of the electrolyser 1 with the second heat exchange module 11, more preferably with the second heat exchanger 11b, then the fluidic connection of the second heat exchanger 11b to the first heat exchanger 11a, then the fluidic connection of the first heat exchanger 11a to the first heat exchanger 9.

Preferably, the electrolyser 1 is fluidically connected to the second air supply line 10. The second supply line 10 ensures the fluidic connection of components arranged upstream from the electrolyser 1 on said second supply line 10. The second supply line ensures the fluidic connection of the compressor 12 to the first heat exchanger 11a, then the fluidic connection of the first heat exchanger 11a to the second heat exchanger 11b, then the fluidic connection of the second heat exchanger 11b to the electric heater 13, then the fluidic connection of the electric heater 13 to the electrolyser 1. According to an option not represented, upstream from the compressor 12, the second supply line ensures the fluidic connection of the second heat exchanger 16 to the compressor 12.

The system comprises fluidic connections described below and forming part of the different supply 2, 10 and discharge 3, 4 lines of the system.

Concerning the first supply line 2, it advantageously comprises a fluidic connection A connected to the inlet of the pump 15.

Advantageously, the first supply line 2 comprises a fluidic connection B connected between the outlet of the pump 15 and the inlet of the expansion device 28.

Advantageously, the first supply line 2 comprises a fluidic connection C connected between the outlet of the expansion device 28 and the inlet of the first heat exchanger 9.

Advantageously, the first supply line 2 comprises a fluidic connection D connected between the outlet of the first heat exchanger 9 and the inlet of the steam generator 6.

Advantageously, the first supply line 2 comprises a fluidic connection E connected between the outlet of the steam generator 6 and the inlet of the first heat exchanger 5a of the heat exchange module 5.

Advantageously, the first supply line 2 comprises a fluidic connection F connected between the outlet of the first heat exchanger 5a and the inlet of the compressor 29.

Advantageously, the first supply line 2 comprises a fluidic connection G connected between the outlet of the compressor 29 and the inlet of the second heat exchanger 5b.

Advantageously, the first supply line 2 comprises a fluidic connection H connected between the outlet of the second heat exchanger 5b and the inlet of the electric heater 14.

Advantageously, the first supply line 2 comprises a fluidic connection I connected between the outlet of the electric heater 14 and the inlet of the electrolyser 1.

Concerning the first discharge line 4, it advantageously comprises a first fluidic connection J between the outlet of the electrolyser 1 and the inlet of the second heat exchanger 5b of the first heat exchange module 5.

Advantageously, the first discharge line 4 comprises a fluidic connection K between the outlet of the second heat exchanger 5b of the first heat exchange module 5 and the inlet of the first heat exchanger 5a of the first heat exchange module 5.

Advantageously, the first discharge line 4 comprises a fluidic connection L between the outlet of the first heat exchanger 5a and the inlet of the second heat exchanger 16.

Advantageously, the first discharge line 4 comprises a fluidic connection M between the outlet of the second heat exchanger 16 and the inlet of the separator 17.

Advantageously, the first discharge line 4 comprises a fluidic connection N between the outlet of the separator 17 and the inlet of the compressor 18.

Advantageously, the first discharge line 4 comprises a fluidic connection O between the outlet of the compressor 18 and the inlet of the third heat exchanger 19.

Advantageously, the first discharge line 4 comprises a fluidic connection P between the outlet of the third heat exchanger 19 and the inlet of the separator 20.

Advantageously, the first discharge line 4 comprises a fluidic connection Q ensuring the outlet of the dihydrogen from the separator 20.

Concerning the second dioxygen discharge line, it advantageously comprises a fluidic connection 100 between the outlet of the electrolyser 1 and the inlet of the second heat exchanger 11b of the second heat exchange module 11.

Advantageously, the second discharge line 3 comprises a fluidic connection 101 between the outlet of the second heat exchanger 11b and the inlet of the first heat exchanger 11a of the second heat exchange module 11.

Advantageously, the second discharge line 3 comprises a fluidic connection 102 between the outlet of the first heat exchanger 11a and the inlet of the first heat exchanger 9.

Advantageously, the second discharge line 3 comprises a fluidic connection 103 between the outlet of the first heat exchanger 9 and the outside.

Concerning the second air supply line 10, it comprises, according to an option not represented, a fluidic connection 110 between the outlet of a second replacement heat exchanger 16 and the inlet of the compressor 12.

Advantageously, the second supply line 10 comprises a fluidic connection 111 between the outlet of the compressor 12 and the inlet of the first heat exchanger 11a of the second heat exchange module 11.

Advantageously, the second supply line 10 comprises a fluidic connection 112 between the outlet of the first heat exchanger 11a and the inlet of the second heat exchanger 11b of the second heat exchange module 11.

Advantageously, the second supply line 10 comprises a fluidic connection 113 between the outlet of the second heat exchanger 11b and the inlet of the electric heater 13.

Advantageously, the second supply line 10 comprises a fluidic connection 114 between the outlet of the electric heater 13 and the inlet of the electrolyser 1.

In operation, the liquid water arrives in the first steam supply line 2, more specifically in the first portion through the fluidic connection A. The fluidic connection A is advantageously connected to the inlet of the pump 15 which moves the liquid water. The water recycling line 21 is advantageously fluidically connected to the first supply line 2 at the fluidic connection B ensuring the fluidic connection of the pump outlet 15 to the inlet in the expansion device 28. The recycled water and the liquid water penetrate into the expansion device 28. In the expansion device 28, the pressure is lowered. As an example, the expansion device 28 ensures a depression of the first supply line 2 at 200 mbars. Preferably, the first depressed supply line 2 extends between the expansion device 28 and the compressor 29. Water emerges from the depressed expansion device 28, through the fluidic connection C and penetrates, preferably directly, into the first heat exchanger 9. In the first heat exchanger 9, the temperature of the water increases by recovering calories from the dioxygen circulating in the first heat exchanger 9. The heated water exits from the first heat exchanger 9 through the fluidic connection D and penetrates, preferably directly, i.e. without intermediate member, in the steam generator 6. The liquid water is transformed into steam by the steam generator 6.

According to the invention, the energy needing to be supplied by the steam generator 6 for the transformation of liquid water into steam is reduced, thanks to the depression module and, in particular, to the expansion device 28 which makes it possible to lower the evaporation temperature of the water, and advantageously also to the first heat exchanger 9 ensuring an increase in temperature of the liquid water by recovering thermal energy from the dihydrogen and from the dioxygen produced by the electrolyser 1.

The steam exits from the steam generator 6 by the fluidic connection E and penetrates, preferably directly, into the first heat exchange module 5, preferably into the first heat exchanger 5a. The steam is heated in the first heat exchanger 5a by recovering calories from the dihydrogen circulating in the first heat exchanger 5a. The overheated steam exits from the first heat exchanger 5a through the fluidic connection F and penetrates, preferably directly, into the compressor 29. The compressor 29 makes it possible to raise the pressure of the supply line 2 downstream from it to enable the operation of the electrolyser 1. The steam pressurised by the compressor 29 exits through the fluidic connection G and penetrates, preferably directly, into the second heat exchanger 5b. The steam is heated again in the second heat exchanger 5b by recovering calories from the dihydrogen circulating in the second heat exchanger 5b. The overheated steam exits from the second heat exchanger 5b through the fluidic connection H and penetrates, preferably directly, into the electric heater 14, if needed. The electric heater 14 ensures the least increase in temperature which is possibly necessary, such that the steam reaches a predefined target temperature to enter into the electrolyser 1. The steam exits from the electric heater 14 through the fluidic connection I and penetrates, preferably directly, into the electrolyser 1.

The electrolyser 1 is supplied with electric current according to a predefined voltage and intensity making it possible to ensure the electrolysis and therefore the production of dihydrogen and dioxygen.

The dihydrogen exits from the electrolyser 1 through the first discharge line, through the fluidic connection J and penetrates, preferably directly, into the first heat exchange module 5, preferably the second heat exchanger 5b. The dihydrogen exits from the electrolyser in the hot gaseous state, it is necessary to lower its temperature to use it and/or store it. The calories from the dihydrogen are therefore recovered by the first supply line and more specifically, the steam circulating there. In the second heat exchanger 5b, the temperature of the dihydrogen lowers by transfer of calories to the benefit of the steam circulating in the second heat exchanger 5b. The cooled dihydrogen exits from the second heat exchanger 5b through the fluidic connection K and penetrates, preferably directly, into the first heat exchanger 5a. In the first heat exchanger 5a, the temperature of the dihydrogen lowers again by transfer of calories to the benefit of the steam circulating in the first heat exchanger 5a. The cooled dihydrogen exits from the first heat exchanger 5a through the fluidic connection L and penetrates, preferably directly, into the second heat exchanger 16. The dihydrogen exits from the second heat exchanger 16 through the fluidic connection M and penetrates, preferably directly, into the liquid/gas separator 17 ensuring the condensation of the dihydrogen. The dihydrogen exits from the liquid/gas separator 17 through the fluidic connection N and undergoes, if needed, another compression in view of another condensation. In this case, the dihydrogen exits from the liquid/gas separator 17 through the fluidic connection N and penetrates, preferably directly, into the compressor 18, from where it exits through the fluidic connection O and penetrates, preferably directly, into the third heat exchanger 19 ensuring the cooling of the dihydrogen. The dihydrogen exits from the third heat exchanger 19 through the fluidic connection P and penetrates, preferably directly, into the liquid/gas separator 20 ensuring the condensation of the dihydrogen. The condensed dihydrogen exits from the liquid/gas separator 20 through the fluidic connection Q and can be used or stored. The condensed liquid water recovered from the liquid/gas separator 17, 20 can be recycled in the first steam supply line 2 through fluidic connection with the water recycling line 21.

The dioxygen produced by the electrolyser exits through the second discharge line 3, through the fluidic connection 100 and penetrates, preferably directly, into the second heat exchanger module 11, preferably the second heat exchanger 11b. The dioxygen exits from the electrolyser in the hot gaseous state, it is necessary to lower its temperature for discharge into the air. The calories from the dioxygen are therefore advantageously recovered by the second supply line 10 and more specifically the air circulating there. In the second heat exchanger 11b, the temperature of the dioxygen lowers by transfer of calories to the benefit of the air circulating in the second heat exchanger 11b. The cooled dioxygen exits from the second heat exchanger 11b through the fluidic connection 101 and penetrates, preferably directly, into the first heat exchanger 11a. In the first heat exchanger 11a, the temperature of the dioxygen lowers again by transfer of calories to the benefit of the air circulating in the first heat exchanger 11a. The cooled dioxygen exits from the first heat exchanger 11a through the fluidic connection 102 and advantageously penetrates, preferably directly, into the first heat exchanger 9 of the recovery module. By passing into the first heat exchanger 9, the temperature of the dioxygen lowers again by transfer of calories to the benefit of the liquid water circulating in the first heat exchanger 9. The air exits from the first heat exchanger through the fluidic connection 103 and is discharged into the air.

According to an option, air is supplied to the electrolyser 1. The air arrives through the second supply line 10. Advantageously, the air passes through the second heat exchanger 16 replacing the air cooler and recovers calories from the dihydrogen circulating in the heat exchanger. This first heat exchange ensures a first heating of the air. The air exits from the second heat exchanger 16 through the fluidic connection 110 and penetrates, preferably directly, into the compressor 12. According to the option illustrated, the air is compressed by the compressor 12 and its temperature increases. The air penetrates into the compressor 12 through the fluidic connection 110. The air exits from the compressor 12 through the fluidic connection 111 and penetrates, preferably directly, into the second heat exchange module 11, preferably into the first heat exchanger 11a. The air is heated in the first heat exchanger 11a by recovering calories from the dioxygen circulating in the first heat exchanger 11a. The overheated air exits from the first heat exchanger 11a through the fluidic connection 112 and penetrates, preferably directly, into the second heat exchanger 11b. The air is heated again in the second heat exchanger 11b by recovering calories from the dioxygen circulating in the second heat exchanger 11b. The overheated air exits from the second heat exchanger 11b through the fluidic connection 113 and penetrates, preferably directly, into the electric heater 13, if needed. The electric heater 13 ensures the last increase in temperature possibly necessary such that the air reaches a predefined target temperature to enter into the electrolyser 1.

The air exits from the electric heater 13 through the fluidic connection 114 and penetrates, preferably directly, into the electrolyser 1.

Figure 2:
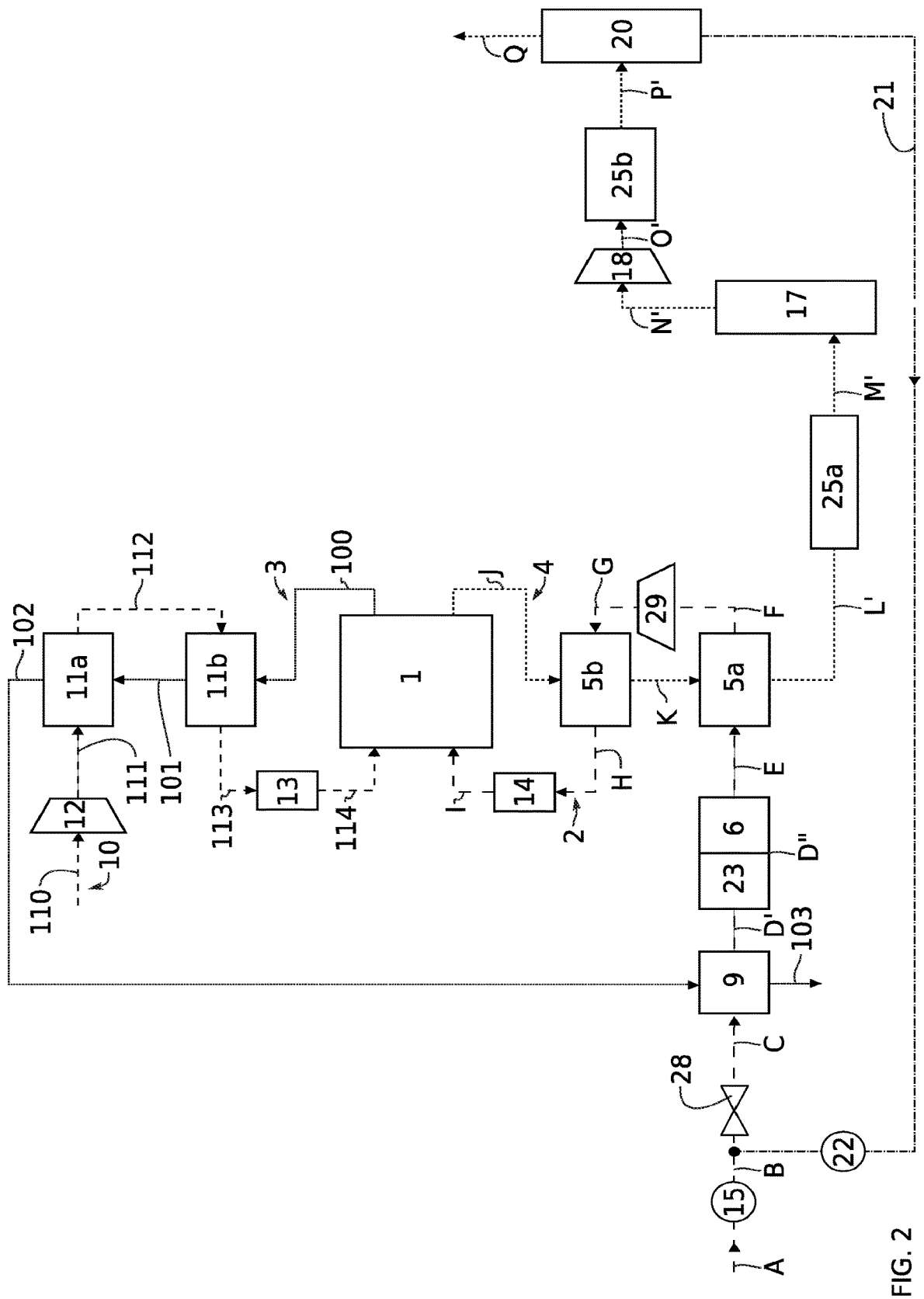
FIG. 2 represents a functional diagram representing the system according to an embodiment of the invention comprising a heat pump.
Figure 3:
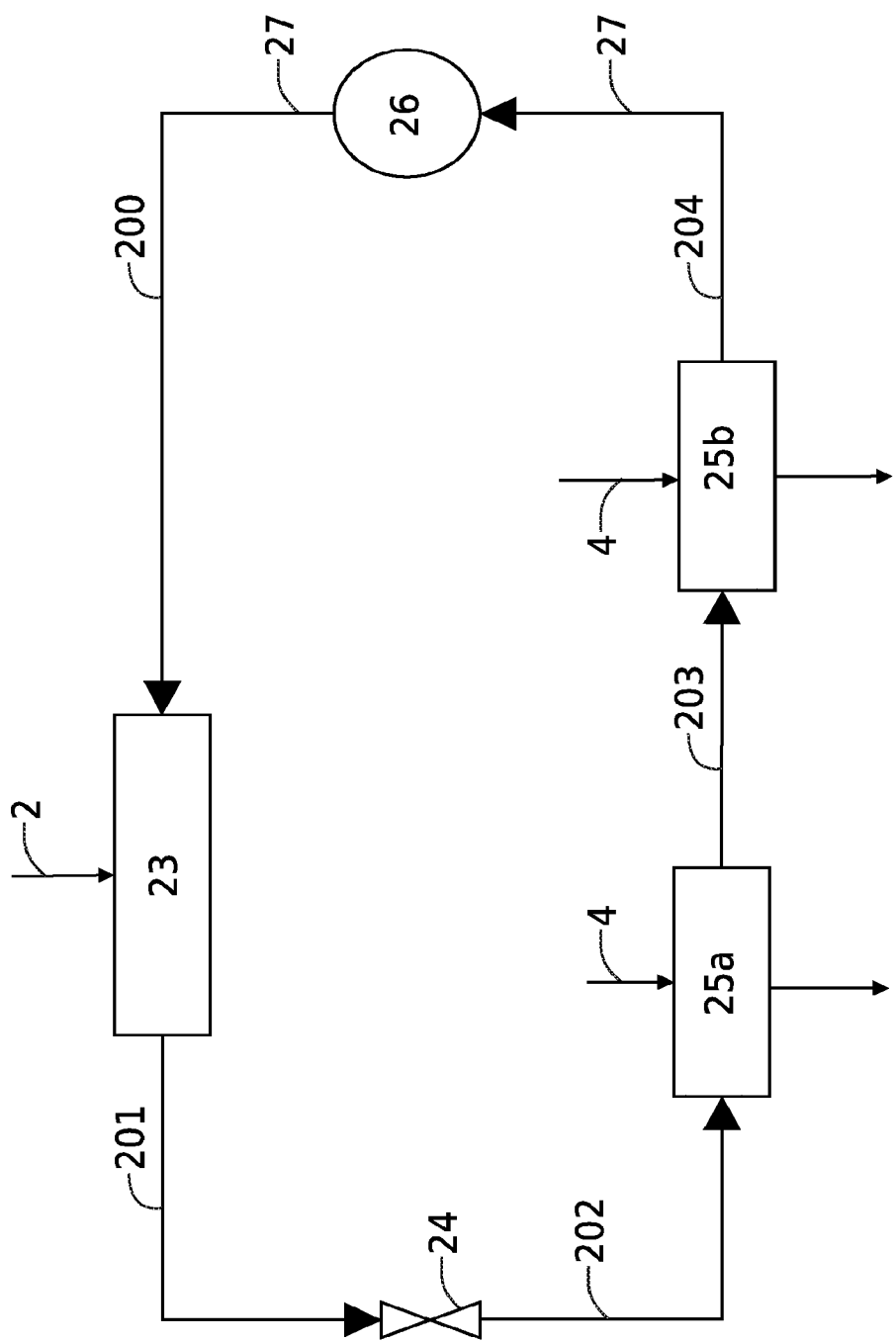
FIG. 3 represents a functional diagram representing the fluid circuit of the heat pump.

According to a second aspect of the invention illustrated in FIG. 2 and which could be combined, or not, with the first aspect, the system comprises a module for recovering the thermal energy from the dihydrogen at the outlet of the heat exchange module 5 to the benefit of the first steam supply line 2.

According to an option, the recovery module comprises a heat pump arranged between the first dihydrogen discharge line 4 and the first steam supply line 2. The heat pump is configured to transfer the thermal energy from the dihydrogen to the liquid water.

The heat pump comprises a condenser 23, an expansion device 24, at least one first evaporator 25a, and a compressor 26.

The heat pump comprises a fluid circuit 27 capable of receiving a heat-transfer fluid.

The heat-transfer fluid is, for example, a fluid conventionally used in heat pumps, such as: 1234yf: 2,3,3,3-tetrafluoropropene (HFO-1234yf), or R245FA pentafluoropropane, or R290 propane.

Preferably, the condenser 23 is arranged between the fluid circuit 27 and the first supply line 2, preferably the condenser 23 is arranged downstream from the first heat exchanger 9 on the first supply line 2.

The fluid circuit 27 ensures the fluidic connection of the components of the heat pump, preferably in a closed circuit.

According to an embodiment, the fluid circuit 27 comprises a fluidic connection 200 connected between the outlet of the compressor 26 and the inlet of the condenser 23. Advantageously, the fluid circuit 27 comprises a fluidic connection 201 connected between the outlet of the condenser 23 and the inlet of the expansion device expansion device 24. Advantageously, the fluid circuit 27 comprises a fluidic connection 202 connected between the outlet of the expansion device 24 and the inlet of the first evaporator 25a.

According to an option illustrated in FIG. 2, the heat pump comprises two evaporators 25a, 25b arranged in series on the fluid circuit between the expansion device 24 and the compressor 26. The fluid circuit 27 comprises a fluidic connection 203 connected between the outlet of the first evaporator and the inlet of the second evaporator 25b. According to this option, advantageously, the fluid circuit 27 comprises a fluidic connection 204 connected between the outlet of the second evaporator 25b and the inlet of the compressor 26.

According to an option, not represented, the heat pump comprises two evaporators 25a, 25b arranged in parallel on the fluid circuit between the condenser 23 and the compressor 26. Preferably, the heat pump comprises two expansion devices 24 arranged in parallel on the fluid circuit respectively upstream from each evaporator 25a, 25b. Advantageously, the fluid circuit 27 comprises a fluidic connection 201 connected between the outlet of the condenser 23 and the inlet of the expansion device 24. Advantageously, the fluid circuit 27 comprises a fluidic connection 202 connected between the outlet of the expansion device 24 and the inlet of the first evaporator 25a. Advantageously, the fluid circuit 27 comprises a fluidic connection 203 connected between the outlet of the first exchanger 25a and the inlet of the compressor 26. Advantageously, in parallel, the fluid circuit 27 comprises a fluidic connection connected between the outlet of the condenser 23 and the inlet of the second expansion device. Advantageously, the fluid circuit 27 comprises a fluidic connection connected between the outlet of the second expansion device and the inlet of the second evaporator 25b. Advantageously, the fluid circuit 27 comprises a fluidic connection connected between the outlet of the second exchanger 25b and the inlet of the compressor 26. Preferably, the fluidic connections 203 coming from the two evaporators 25a, 25b meet before the inlet of the compressor 26 so as to ensure one single inlet in the compressor 26.

According to the invention, the condenser 23 of the heat pump is arranged on the first steam supply line 2 upstream from the steam generator 6 to transmit calories from the heat-transfer fluid to the benefit of the liquid water circulating in the first supply line 2 upstream from the steam generator 6, more specifically, the first portion of the first supply line 2. Preferably, the condenser 23 is arranged on the section 30 of the first supply line 2. Preferably, the condenser 23 is arranged downstream from the expansion device 28, and more specifically, downstream from the first heat exchanger 9. The condenser 23 is arranged preferably downstream from the first heat exchanger 9 and upstream from the steam generator 6. The outlet of the first heat exchanger 9 is fluidically connected through a fluidic connection D' to the inlet of the condenser 23. The outlet of the condenser 23 is fluidically connected to the inlet of the steam generator 6 through a fluidic connection D".

According to the invention, the first evaporator 25a of the heat pump is arranged on the first dihydrogen discharge line 4, preferably downstream from the first heat exchange module 5, more specifically, downstream from the first heat exchanger 5a of the first heat exchange module 5. Preferably, the first evaporator 25a is arranged upstream from the first treatment stage, i.e. optionally upstream from the second heat exchanger 16 not represented in FIG. 2. The first evaporator 25a ensures the transfer of energy between the dihydrogen circulating in the first discharge line 4 and the heat-transfer fluid circulating in the fluid circuit 27 of the heat pump.

According to an option illustrated in FIG. 2, the outlet of the first heat exchanger 5a of the first heat exchange module 5 is fluidically connected to the inlet of the first evaporator 25a through a fluidic connection L'. The outlet of the first evaporator 25a is fluidically connected to the inlet of the separator 17 through a fluidic connection M'. According to an option not represented, the outlet of the first evaporator 25a is fluidically connected to the inlet of the second heat exchanger 16 through a fluidic connection not represented, and the outlet of the second heat exchanger 16 is fluidically connected to the inlet of the separator 17 through a fluidic connection not represented.

According to an embodiment, the heat pump comprises a second heat exchanger 25b. The second heat exchanger 25b is arranged downstream from the first dihydrogen treatment stage and advantageously upstream from the second dihydrogen treatment stage. Optionally, the second evaporator 25a is arranged upstream from the third heat exchanger 19 not represented in FIG. 2, preferably downstream from the compressor 18.

According to an option illustrated in FIG. 2, the outlet of the compressor 18 is fluidically connected to the inlet of the second evaporator 25b through a fluidic connection O'. The outlet of the second evaporator 25b is fluidically connected to the inlet of the separator 20 through a fluidic connection P'. According to an option not represented, the outlet of the second evaporator 25b is fluidically connected to the inlet of the third heat exchanger 19 through a fluidic connection not represented, and the outlet of the third heat exchanger 19 is fluidically connected to the inlet of the separator 17 through a fluidic connection not represented.

According to another option, not represented, the heat pump comprises one single evaporator 25a, the outlet of which is connected directly to the inlet of the compressor 26 through the fluidic connection 203.

The present invention makes it possible to utilise the waste heat of the system, and more specifically, the thermal discharges of the dihydrogen produced. The heat pump is an active system, making it possible to reinject the calories removed onto the dihydrogen produced, upstream from the steam generator and at a temperature greater than the evaporation temperature of the water.

The table below gives, as an example, the temperature and the pressure in certain points of the system according to the invention, such as illustrated in FIG. 1.

| Fluidic connection | Temperature ° C. | Pressure Bar |
|---|---|---|
| A | 20 | |
| B | 20 | 1.8 |
| C | 116 | |
| D | | |
| E | 60 | |
| F | | |
| G | | |
| H | 614 | |
| I | 700 | |
| J | 700 | |
| K | 330 | |
| L | 117 | |
| M | | |
| N | 45 | |
| O | | |
| P | 41 | |
| Q | | |
| 100 | 700 | |
| 101 | 450 | |
| 102 | 230 | |
| 111 | 65 | 1.55 |
| 112 | 350 | |
| 113 | 670 | |
| 114 | 700 | |
| 200 | 130 | |
| 201 | | |
| 202 | 90 | |
| 203 | | |
| 204 | | |

This solution according to the first aspect of the invention enables a gain of around 7% on the overall yield of electricity conversion into dihydrogen.

The invention is not limited to the embodiments described above and extends to all embodiments covered by the claims.

LIST OF REFERENCES

1 Electrolyser
2 Steam supply line
3 Dioxygen discharge line
4 Dihydrogen discharge line
5a First heat exchanger of the first heat exchange module
5b Second heat exchanger of the first heat exchange module
6 Steam generator
7 Compressor
9 First heat exchanger
10 Air supply line
11a First heat exchanger of the second heat exchange module
11b Second heat exchanger of the second heat exchange module 12 Compressor
13 Electric heater
14 Electric heater
15 Pump
16 Second heat exchanger
17 Liquid/gas separator
18 Compressor
19 Third heat exchanger
20 Liquid/gas separator
21 Water recycling line
22 Pump
23 Condenser
24 Expansion device
25a First evaporator
25b Second evaporator
26 Compressor
27 Fluid circuit
28 Expansion device
29 Compressor
30 Section
A Fluidic connection entering into the pump 15
B Fluidic connection between the pump 15 and the expansion device 28
C Fluidic connection between the expansion device 28 and the first heat exchanger 9
D Fluidic connection between the first heat exchanger 9 and the steam generator 6
E Fluidic connection between the steam generator 6 and the first heat exchanger 5a
F Fluidic connection between the first heat exchanger 5a and the compressor 29
G Fluidic connection between the compressor 29 and the second heat exchanger 5b and
H Fluidic connection between the second heat exchanger 5b and the heater 14
I Fluidic connection between the heater 14 and the electrolyser 1
J Fluidic connection between the electrolyser 1 and the second heat exchanger 5b
K Fluidic connection between the second heat exchanger 5b and the first heat exchanger 5a
L Fluidic connection between the first heat exchanger 5a and the air cooler 16
M Fluidic connection between the air cooler 16 and the separator 17
N Fluidic connection between the separator 17 and the compressor 18
O Fluidic connection between the compressor 18 and the air cooler 19
P Fluidic connection between the air cooler 19 and the separator 20
Q Fluidic connection exiting from the separator 20
D' Fluidic connection between the first heat exchanger 9 and the condenser 23
D" Fluidic connection between the condenser 23 and the steam generator 6
L' Fluidic connection between the first heat exchanger 5a and the first evaporator 25a
M' Fluidic connection between the first evaporator 25a and separator 17
O' Fluidic connection between the compressor 18 and the second evaporator 25b
P' Fluidic connection between the second evaporator 25b and the separator 20
100 Fluidic connection between the electrolyser 1 and the second heat exchanger 11b
101 Fluidic connection between the second heat exchanger 11b and the first heat exchanger 11a
102 Fluidic connection between the first heat exchanger 11a and the first heat exchanger 9
110 Inlet fluidic connection in the compressor 12
111 Fluidic connection between the compressor 12 and the first heat exchanger 11a
112 Fluidic connection between the first heat exchanger 11a and the second heat exchanger 11b
113 Fluidic connection between the second heat exchanger 11b and the heater 13
114 Fluidic connection between the heater 13 and the electrolyser 1
200 Fluidic connection between the compressor 26 and the condenser 23
201 Fluidic connection between the condenser 23 and the expansion device 24
202 Fluidic connection between the expansion device 24 and the first evaporator 25a
203 Fluidic connection between the first evaporator 25a and the second evaporator 25b
204 Fluidic connection between the second evaporator 25b and the compressor 26

The invention claimed is:

1. A system comprising:
a high temperature electrolyser,
a first supply line of the electrolyser configured to supply the electrolyser with steam,
a first discharge line of the electrolyser configured to discharge dihydrogen from the electrolyser,
a second discharge line of the electrolyser configured to discharge dioxygen from the electrolyser,
a first heat exchange module configured to ensure a heat exchange between the first supply line and the first discharge line,
a steam generator arranged on the first supply line, upstream from the first heat exchange module, and configured to produce steam from liquid water, and
a module for depressing a section of the first supply line, the module comprising a first expansion device configured to lower an evaporation temperature of water in the first supply line and a first compressor configured to compress steam in the supply line heated by the first heat exchange module, the first expansion device being arranged on the first supply line upstream from the steam generator and the first compressor being arranged on the first supply line downstream from the steam generator.

2. The system according to claim 1, wherein the first compressor is arranged downstream from a connection of the first discharge line to the first heat exchange module.

3. The system according to claim 2, wherein the first heat exchange module comprises a first heat exchanger and a second heat exchanger arranged in series, each configured to exchange heat between the first supply line and the first discharge line, and the first compressor is arranged downstream from the first heat exchanger and upstream from the second heat exchanger.

4. The system according to claim 1, comprising a first heat exchanger arranged between the second discharge line and the first supply line, upstream from the steam generator.

5. The system according to claim 4, wherein the first expansion device is arranged on the first supply line upstream from the first heat exchanger.

6. The system according to claim 1, comprising a second supply line of the electrolyser configured to supply the electrolyser with air.

7. The system according to claim 6, comprising a second heat exchange module configured to ensure a heat exchange between the second supply line and the second discharge line.

8. The system according to claim 1, comprising a module for recovering thermal energy from the dihydrogen at an outlet of the first heat exchange module to benefit the first supply line, the recovery module comprising a heat pump comprising:
- a fluid circuit configured to receive a heat-transfer fluid,
- a first evaporator arranged on the first discharge line downstream from the first heat exchange module configured to transfer the thermal energy from the dihydrogen to the heat-transfer fluid,
- a second compressor configured to compress the heat-transfer fluid,
- a condenser arranged on the first supply line upstream from the steam generator and configured to transfer thermal energy from the heat-transfer fluid to the liquid water, and
- a second expansion device configured to expand the heat-transfer fluid, the fluid circuit being configured to fluidically connect the first evaporator to the second compressor, the second compressor to the condenser, the condenser to the second expansion device and the second expansion device to the first evaporator.

9. The system according to claim 8, comprising at least one second heat exchanger arranged on the first discharge line, downstream from the first evaporator.

10. The system according to claim 9, wherein the heat pump comprises a second evaporator.

11. The system according to claim 10, comprising a second heat exchanger arranged between the second discharge line and the first supply line, upstream from the steam generator, wherein the second evaporator is arranged in series on the fluid circuit of the heat pump downstream from the second heat exchanger.

12. The system according to claim 10, comprising at least one third heat exchanger arranged on the first discharge line downstream from the second evaporator.

13. The system according to claim 10, comprising, downstream from the at least one second heat exchanger and upstream from the second evaporator, a liquid/gas separator.

14. The system according to claim 9 comprising a second supply line of the electrolyser configured to supply the electrolyser with air, the at least one second heat exchanger being arranged between the first discharge line, downstream from the first evaporator, and the second supply line.

15. The system according to claim 12, comprising:
- a second supply line of the electrolyser configured to supply the electrolyser with air, and
- a third compressor arranged on the second supply line and configured to compress the air.

* * * * *